United States Patent Office 2,885,280
Patented May 5, 1959

---

2,885,280

PROCESS FOR REMOVING IRON FROM TITANIFEROUS MATERIAL

André Greffe, Annecy, France, assignor to Societe d'Electro-Chimie d'Electro-Metallurgie et des Acieres Electriques d'Ugine, Paris, France, a corporation of France No Drawing. Application May 9, 1956
Serial No. 583,621

Claims priority, application France June 30, 1955

8 Claims. (Cl. 75—1)

The present invention relates to the removal of iron from raw materials containing iron and titanium oxides, particularly in obtaining concentrates of titanium oxide from ilmenite.

One of the existing processes for iron removal consists in subjecting the ore to a reducing fusion step. The reducing agent usually is a material containing carbon. A flux such as lime, soda or magnesia preferably is added. Pig-iron and a slag containing titanium oxide are obtained. It has been proposed to perform the reducing fusion step so as to obtain a fluid slag which can be separated from the pig-iron due to a difference of density between the two materials.

These existing processes for removal of the iron by separating the pig-iron and slag are difficult to carry out; in particular, they require a close control of the operation temperature and of the amount of carbon used. If the temperature is too low or if the amount of carbon used is too small, the reduction of the iron oxide is incomplete and the slag contains a large quantity of iron. If the amount of carbon used is too large or the temperature is too high, a portion of the titanium oxide is also reduced, and inferior titanium oxides and even titanium carbide is obtained. Moreover, the flux used: lime, soda or magnesia in particular, remains in the slag, which is detrimental in the further chemical treatment necessary for the titanium extraction.

Other processes for removing iron from iron-titanium ores consist in subjecting the ore to a reduction without fusion, then separating the iron from the titaniferous material by mechanical operations, or oxidizing the iron to form more or less hydrous iron oxides which can be mechanically separated from the titaniferous material.

But these latter processes involve costly mechanical separations; moreover, the separated iron is in a form which has little economic value.

The present invention avoids these disadvantages. It involves a process for removing iron from titaniferous materials, particularly ilmenite, by first carrying out a partial reduction of the ore in the solid state. This partial reduction is carried out in such a way that practically all the iron is reduced to the state of metallic iron without any appreciable part of titanium oxide being reduced. The mass so produced is then melted, preferably with no intermediary cooling, by introducing the partially reduced ore directly into a furnace. The melt separates into two liquid beds, the lower bed being composed of ferrous metal, the upper bed of a fluid slag very rich in titanium oxide. These beds are then separated from each other.

A solid reducing agent, such as coke, can be used in the process. Preferably a coke containing less than 10% ash is used. Both the material to be treated and the coke are crushed very fine prior to the reduction.

A gaseous reducing agent such as water-gas, gasogene, blast-furnace gas, and/or hydrogen may also be used. The reducing gas is flowed directly through a bed of ore to accomplish the reduction.

The partial reduction is carried out at a temperature lower than that necessary to bring about a reduction of titanium oxide to form inferior oxides or carbide. The temperature used is generally between 900° and 1250° C. However, this temperature depends on the composition of the reducing agent employed. A gaseous reducing agent normally permits a lower temperature to be used than that necessary with a solid reducing agent.

The fusion or melting step, for which generally no flux is added, can be performed in any known means, for example, in an electric furnace. The fusion yields two liquid beds: the lower bed composed of iron or liquid pig-iron; the upper bed of a slag composed of titanium oxide, a little iron and possibly part of the ash from the reducing agent. The titanium content of the slag varies in proportion to the quantity of impurities contained in the ore (other than iron), the ash content of the reducing agent and the efficiency with which the reduction step has been carried out. The fusion is normally carried out at a temperature above 1650° C.

The process comprises many advantages:

(a) The iron oxide is reduced without reducing the titanium oxide, which, of course, lessens the amount of reducing agent used in the process.

(b) The fluid slag obtained from the fusion permits an easy separation of the metallic iron by decantation.

(c) The titanium oxide obtained is very concentrated and is not contaminated by inferior oxides or carbides, soda or lime, or any other material normally derived from a flux. In carrying out the process of the invention, a slag is obtained containing up to 95% $TiO_2$, preferably between 85–95%. Of course, such a quality can only be obtained if the treated ores are fairly pure.

(d) The iron is eliminated in a valuable and usable form.

*Example*

An ilmenite ore composed essentially of:

| | Percent |
|---|---|
| $TiO_2$ | 63.34 |
| FeO total | 27.90 |
| $SiO_2$ | 0.48 |
| $Al_2O_3$ | 1.40 |
| Ignition loss | 3.10 | was crushed to a size small enough to pass completely through a 40 screen. The reducing agent employed was coke containing about 10% ash and 1% volatile materials crushed to a size small enough to pass completely through an 80 screen.

100 parts by weight of ilmenite were mixed with 10 parts by weight of coke; then the mixture was heated to 1200° C. for an hour to reduce the iron oxide but not the titanium dioxide.

Without allowing the partially reduced product to cool, it was immediately introduced into a small electrical furnace where it was melted by raising the temperature to 1650° C. Two beds were obtained: the lower bed consisted of a metal containing about: 1.80% C, 0.2% Si, traces of Ti, and the balance Fe; the upper bed consisted of a slag containing: 94.78% $TiO_2$ and an amount of iron (expressed as FeO) of 3.67%. Part of this iron was in the form of metallic iron in very fine particles.

While I have described a present preferred embodiment of my invention, it is to be understood that it may be otherwise embodied within the scope of the following claims.

I claim:

1. A process for removing iron from titaniferous materials containing titanium oxide and iron oxide, which comprises treating the titaniferous material in the solid state with a reducing agent at a temperature between about 900° C. and 1250° C. to reduce substantially all of the iron oxide to iron but to prevent reduction of an appreciable part of the titanium oxide, then melting the so obtained product to produce a lower bed of pig-iron and an upper bed of fluid slag rich in free titanium oxide, and separating the pig-iron from the slag.

2. The process of claim 1, wherein the melting step immediately follows the partial reduction step without allowing any substantial cooling of the reduced material and in the absence of added flux.

3. The process of claim 1, wherein a reducing agent used in the reduction is coke.

4. The process of claim 1, wherein a reducing agent used in the reduction is reducing gas.

5. The process of claim 1, wherein the melting step is performed above 1650° C. to melt the products from the reduction.

6. The process of claim 1, wherein a reducing agent used in the reduction is a solid.

7. A process for removing iron from titaniferous materials containing titanium oxide and iron oxide, which comprises mixing the titaniferous material with only a carbonaceous reducing agent in an amount sufficient to reduce substantially all the iron oxide to iron but none of the titanium oxide; then maintaining the mixture in a solid state at a temperature between about 900° C. and 1250° C. to effect said reduction; thereafter melting the otbained product to effect a separation into a first molten layer of pig-iron and a second molten layer of slag rich in free titanium oxide, said second layer containing a maximum of 5% iron (expressed as FeO), and separating the layers.

8. A process for removing iron from titaniferous material containing titanium oxide and iron oxide, which comprises mixing together only the titaniferous material and a carbonaceous reducing agent, said agent being present in an amount sufficient to reduce substantially all the iron oxide to iron but none of the titanium oxide; then maintaining the mixture at a temperature between 900° C. and 1250° C. to effect said reduction; said mixture being maintained in a solid state during the entire reduction period; all of said carbonaceous reducing agent being consumed in reducing said iron oxide to iron during said reduction; thereafter melting the obtained product to effect a separation into a first molten layer of pig iron and a second molten layer of slag rich in titanium oxide, said second layer containing a maximum of 5% iron (expressed as FeO), and separating the layers.

References Cited in the file of this patent

UNITED STATES PATENTS

| | | |
|---|---|---|
| 2,631,941 | Cole | Mar. 17, 1953 |
| 2,680,681 | Armant et al. | June 8, 1954 |

FOREIGN PATENTS

| | | |
|---|---|---|
| 391,704 | Canada | Oct. 1, 1940 |